US011623620B2

(12) United States Patent
Putz

(10) Patent No.: US 11,623,620 B2
(45) Date of Patent: Apr. 11, 2023

(54) METHOD AND BRAKE CONTROL FOR ACTUATING A FRICTION BRAKE

(71) Applicant: VE VIENNA ENGINEERING FORSCHUNGS- UND ENTWICKLUNGS GMBH, Vienna (AT)

(72) Inventor: Michael Putz, Sebersdorf (AT)

(73) Assignee: VE VIENNA ENGINEERING FORSCHUNGS UND ENTWICKLUNGS GMBH, Vienna (AT)

( * ) Notice: Subject to any disclaimer, the term of this patent is extended or adjusted under 35 U.S.C. 154(b) by 143 days.

(21) Appl. No.: 16/753,538

(22) PCT Filed: Oct. 2, 2018

(86) PCT No.: PCT/EP2018/076775
§ 371 (c)(1),
(2) Date: Apr. 3, 2020

(87) PCT Pub. No.: WO2019/068701
PCT Pub. Date: Apr. 11, 2019

(65) Prior Publication Data
US 2020/0307529 A1 Oct. 1, 2020

(30) Foreign Application Priority Data

Oct. 5, 2017 (AT) .............................. A 50853/2017

(51) Int. Cl.
*B60T 8/17* (2006.01)
*B60T 1/06* (2006.01)
(Continued)

(52) U.S. Cl.
CPC ................ *B60T 8/17* (2013.01); *B60T 1/065* (2013.01); *B60T 8/171* (2013.01); *B60T 8/172* (2013.01);
(Continued)

(58) Field of Classification Search
CPC .......... B60T 8/17; B60T 8/171; B60T 17/221; B60T 8/172; B60T 1/065; B60T 13/746;
(Continued)

(56) References Cited

U.S. PATENT DOCUMENTS

| 5,939,978 A * | 8/1999 | Kyrtsos ................. F16D 66/021 340/454 |
| 7,011,186 B2 * | 3/2006 | Frentz .................... B60T 17/22 188/1.11 E |

(Continued)

FOREIGN PATENT DOCUMENTS

| DE | 10 2004 008383 | 9/2005 |
| DE | 10 2011 004772 | 8/2012 |

(Continued)

OTHER PUBLICATIONS

Int'l Search Report (Form PCT/ISA/210) conducted in Int'l Appln. No. PCT/EP2018/076775 (dated Jan. 21, 2019) (with translation).
(Continued)

*Primary Examiner* — Pamela Rodriguez

(57) ABSTRACT

For rapid and precise actuation of a friction brake, the thermal expansion of the friction brake is determined using a thermal model of the friction brake and therefrom the temperature-dependent shift in the contact point is determined for the braking operation and the temperature-dependent shift in the contact point is taken into account when determining the actuation measure of the friction brake to be adjusted.

18 Claims, 5 Drawing Sheets

(51) Int. Cl.
  *B60T 8/171* (2006.01)
  *B60T 8/172* (2006.01)
  *B60T 17/22* (2006.01)
  *F16D 55/2255* (2006.01)
  *F16D 65/18* (2006.01)
  *F16D 65/38* (2006.01)
  *F16D 66/00* (2006.01)
  *B60T 13/74* (2006.01)
  *F16D 121/14* (2012.01)
  *F16D 121/24* (2012.01)
  *F16D 125/28* (2012.01)

(52) U.S. Cl.
  CPC ........ *B60T 17/221* (2013.01); *F16D 55/2255* (2013.01); *F16D 65/183* (2013.01); *F16D 65/38* (2013.01); *F16D 66/00* (2013.01); *B60T 13/746* (2013.01); *F16D 2066/001* (2013.01); *F16D 2066/006* (2013.01); *F16D 2121/14* (2013.01); *F16D 2121/24* (2013.01); *F16D 2125/28* (2013.01)

(58) Field of Classification Search
  CPC .... F16D 55/2255; F16D 65/183; F16D 65/38; F16D 66/00; F16D 2121/14; F16D 2066/001; F16D 2066/006; F16D 2121/24; F16D 2125/28
  See application file for complete search history.

(56) References Cited

U.S. PATENT DOCUMENTS

| | | | |
|---|---|---|---|
| 7,537,292 B2 | 5/2009 | Heubner et al. | |
| 9,518,625 B2 | 12/2016 | Putz | |
| 9,909,943 B2 | 3/2018 | Ono et al. | |
| 10,247,267 B2 | 4/2019 | Putz | |
| 2004/0046444 A1 | 3/2004 | Heubner et al. | |
| 2007/0052289 A1 | 3/2007 | Nilsson et al. | |
| 2009/0084637 A1* | 4/2009 | Bailey | F16D 66/021 188/1.11 E |
| 2009/0114488 A1 | 5/2009 | Bailey et al. | |
| 2015/0114771 A1* | 4/2015 | Putz | B60T 7/042 188/158 |
| 2015/0260246 A1 | 9/2015 | Yao | |
| 2016/0053839 A1 | 2/2016 | Putz | |
| 2017/0115174 A1 | 4/2017 | Ono et al. | |
| 2017/0350462 A1 | 12/2017 | Yao et al. | |

FOREIGN PATENT DOCUMENTS

| | | |
|---|---|---|
| DE | 10 2011 016126 | 10/2012 |
| DE | 10 2016 120418 | 4/2017 |
| EP | 1 762 746 | 3/2007 |
| EP | 2 211 071 | 7/2010 |
| EP | 2 927 068 | 10/2015 |
| EP | 3 251 908 | 12/2017 |
| WO | 02/22417 | 3/2002 |
| WO | 2006/085047 | 8/2006 |
| WO | 2010/133463 | 11/2010 |
| WO | 2014/139919 | 9/2014 |
| WO | 2014/170259 | 10/2014 |

OTHER PUBLICATIONS

Int'l Written Opinion (Form PCT/ISA/237) conducted in Int'l Appln. No. PCT/EP2018/076775 (dated Jan. 21, 2019) (with translation).

Austria Search Report conducted in counterpart Austria Appln. No. A 50853/2017 (dated Jun. 8, 2018).

* cited by examiner

METHOD AND BRAKE CONTROL FOR ACTUATING A FRICTION BRAKE

BACKGROUND

1. Field of Invention

The present invention relates to a method for actuating a friction brake, wherein, for a braking process, a brake pad arranged on a pressing device of the friction brake is pressed against a friction surface of the friction brake and the pressing device for the braking process is driven by an actuating device of the friction brake, wherein for a braking operation to achieve a predetermined effect measure of the friction brake, whereas the effect measure being a measure of the braking effect, the brake pad of the friction brake is moved from an initial position while overcoming an air gap to the friction surface of the friction brake and the brake pad is pressed against a friction surface starting from a contact point between the brake pad and the friction surface in that an actuation measure of the friction brake associated to the predetermined effect measure is determined and said actuation measure is adjusted by means of the pressing device and the actuating device. The invention further relates to a brake control for carrying out the method.

2. Description of the Background

A friction brake generates a predetermined braking torque for braking by pressing a brake pad against a friction surface, or, analogously, a braking force, generally a certain braking effect. Using the known displacement-force behavior of the friction brake for brake actuation, the braking action can be assigned, for example, to an actuation travel (for example an actuation angle), which must be covered in order to produce the desired braking action. Since braking torque is equal to friction force times known friction radius and friction force is equal to braking force times known friction coefficient, each of these values can equivalently be interpreted as braking effect. Electrically operated friction brakes use an electric motor to actuate the friction brake. The electric motor, possibly via an intermediate gear or transmission parts, such as cams, eccentrics, levers, rods, wedges, rotation of ball ramps, screws, rolling elements in thread turns (e.g. ball screws), liquids, gases, etc., drives a pressing device that covers the actuation travel in order to press the brake pad against the friction surface to achieve the desired braking effect. Examples of friction brakes can be found in EP 2 433 025 B1 or WO 2014/139919 A1.

In order to control the friction brake, i.e., to adjust a desired braking effect in an orderly manner, either the braking effect (braking torque, friction force, braking force) or equivalently the actuation travel, or both, must be controlled, which is usually done in an electronically controlled friction brake by means of a brake control unit, for example using a PID controller.

The control of the friction brake via the actuation travel is simple but unreliable, since it cannot be reliably concluded that the required braking effect has been achieved. For example, the influence of the wear of the brake pads or the changing stiffness of the friction brake at different temperatures is not taken into account and it is not ensured that the desired braking effect is actually achieved when the predetermined target position is reached. The control of the braking effect, on the other hand, requires a measurement or estimation of a current braking effect in order to make it available in a feedback of the control as the actual braking effect. The measurement of a braking force or a braking torque as a braking effect is difficult and complex, especially in the case of electrically operated brakes, as already stated in WO 2014/170259 A2. Since a friction brake is a safety-critical device of a machine or a vehicle, a high level of functional safety must be ensured, which often necessitates a redundant design of measuring and control units. This too can make a conventional measurement of a braking effect complex and expensive, and therefore unsuitable or impractical in practice for many applications.

DE 10 2011 004 772 A1 discloses a method for adjusting the clamping force exerted by a parking brake in a vehicle, in which the clamping process for generating the clamping force is carried out until the mechanical clamping work generated thereby reaches a threshold value. The actuation energy is thus evaluated and applied until a threshold value has been reached. This is a simple but very inaccurate brake actuation, which is sufficient for a parking brake, but is certainly unsuitable for a service brake, in particular of a vehicle, since it is important in a vehicle to achieve a target braking effect quickly and precisely, especially in connection with braking and stability systems (such as ABS, ESR, etc.) in modern vehicles. An unwanted over actuation of the brake, i.e. an unwanted excessive braking effect, can lead to undesired and dangerous blocking of the vehicle wheel, and an unwanted under actuation, i.e. an unwanted insufficient braking effect, would lead to the required braking effect not being achieved.

WO 2014/170259 A2 therefore proposes to control the brake actuation of an electrical friction brake via the actuation energy. To this end, a desired braking effect is converted into a target position of the friction brake that is set by the brake. For this target position, an associated target actuation energy can be determined from known data on the friction brake. During the actuation, the actuation energy is determined and the determined actual actuation energy is compared with the target actuation energy and any deviation being compensated for. WO 2014/170259 A2 also states that lifetime or temperature-related losses during actuation can also be taken into account, for example by compensating for the losses when determining the actuation energy. The changing stiffness, which changes over the temperature of the friction brake, can also be taken into account in the actuation energy.

However, this method is also only suitable to a limited extent for a very precise and rapid setting of the desired braking effect. Rather, the method is based on subsequently compensating for the deviation from the desired braking effect after the actual braking event. The requirements for accuracy, as well as for quick controllability of the adjusted braking effect of an electrically operated friction brake, however, are constantly increasing. An example of this is the service brake of a hybrid vehicle or electric vehicle. Modern hybrid or electric vehicles use the kinetic energy of the vehicle when braking to recover energy. For this purpose, the electric motor is used as an electrical generator when braking, which causes a braking effect on the vehicle. However, this depends on the speed of the vehicle or the speed of the generator. The slower the vehicle, the less generator braking effect can be achieved and the more braking effect must be added from the service brake. This requires a very precise control of the braking effect of the service brake in order to achieve a balanced braking event. Another examples are, of course, modern braking and stability systems in vehicles, which require very precise and quick adjustment of the braking effect.

SUMMARY

It is therefore an object of the present invention to provide a method for actuating a friction brake with which a desired braking effect can be adjusted very precisely and quickly.

In order to increase the accuracy, it is in particular provided to determine the thermal expansion of the friction brake and therefrom the temperature-dependent shift of the contact point for the braking operation on the basis of a thermal model of the friction brake and to take the temperature-dependent shift of the contact point into account when determining the actuation measure of the friction brake to be adjusted. In this way, it can be achieved that the deviation between the desired braking effect and the braking effect actually achieved during the braking operation does not become too large and therefore only a slight, if any, difference has to be compensated for subsequently. The desired braking effect can also be adjusted faster.

The actuation measure to be adjusted is particularly simply increased or decreased depending on the shift of the contact point.

The effect measure at the end of the braking operation is very particularly advantageously determined and the kinetic energy of the pressing device and/or the actuating device, or parts thereof, is at least partially taken into account for the actuating operation for determining the effect measure. In this way, the influence of the kinetic energy on the brake actuation can be taken into account, which leads to a more precise determination of the effect measure at the end of the brake actuation and thus to a more precise compensation of the deviation between the desired braking effect and the braking effect actually achieved during the braking operation. In this way, the braking operation becomes more precise and faster. In the same way, the kinetic energy of the pressing device and/or the actuating device, or parts thereof, required to overcome the air gap can also be taken into account when determining the effect measure. This allows the accuracy to be increased even further. To further increase accuracy, the temperature-dependent shift of the contact point can also be taken into account when determining the kinetic energy required to overcome the air gap.

The consideration of further effects during a braking operation can also contribute to increasing the accuracy. For example, a spring can act on the pressing device and/or the actuating device at least temporarily during the braking operation and the effect of the spring can be taken into account when determining the effect measure. Or self-reinforcement of the friction brake can act at least temporarily during the braking operation and the effect of self-reinforcement can be taken into account when determining the effect measure. Or a determined effect measure and/or actuation measure can be corrected with a predetermined correction factor in order to reduce remaining inaccuracies.

In a further advantageous embodiment, the thermal model is used to determine the stiffness of the friction brake, or parts thereof, which changes due to changed temperatures, and the changing stiffness is taken into account when the friction brake is actuated. Taking this influence on the braking operation into account can also increase the accuracy of the braking operation.

In order not to have to continuously operate the wear adjuster, the air gap can only be adjusted after braking if the deviation between the desired effect measure and the actually determined effect measure exceeds a predetermined threshold. For this purpose, an adjustment measure can be derived from the deviation, with which the air gap is adjusted by means of a wear adjuster and/or the pressing device.

The present invention is described in greater detail in the following with reference to FIGS. 1 to 7, which show exemplary, schematic and non-limiting advantageous embodiments of the invention. In the drawings:

The invention is explained in more detail below with reference to FIG. 1 using a schematically illustrated friction brake 1 in the form of a floating caliper disc brake, as is often used in vehicles. Floating caliper disc brakes are well known per se, which is why only so far the properties and function of a floating caliper disc brake and the installation of a floating caliper disc brake, for example in a vehicle, are dealt with as far as is necessary for understanding the invention. In principle, however, the invention can also be applied to other types of brakes, such as a drum brake. Likewise, a friction surface other than a brake disc or a brake drum can also be provided, for example a more or less flat surface, for example in a brake for a linear movement, for example for an elevator.

DETAILED DESCRIPTION

Figure 1:
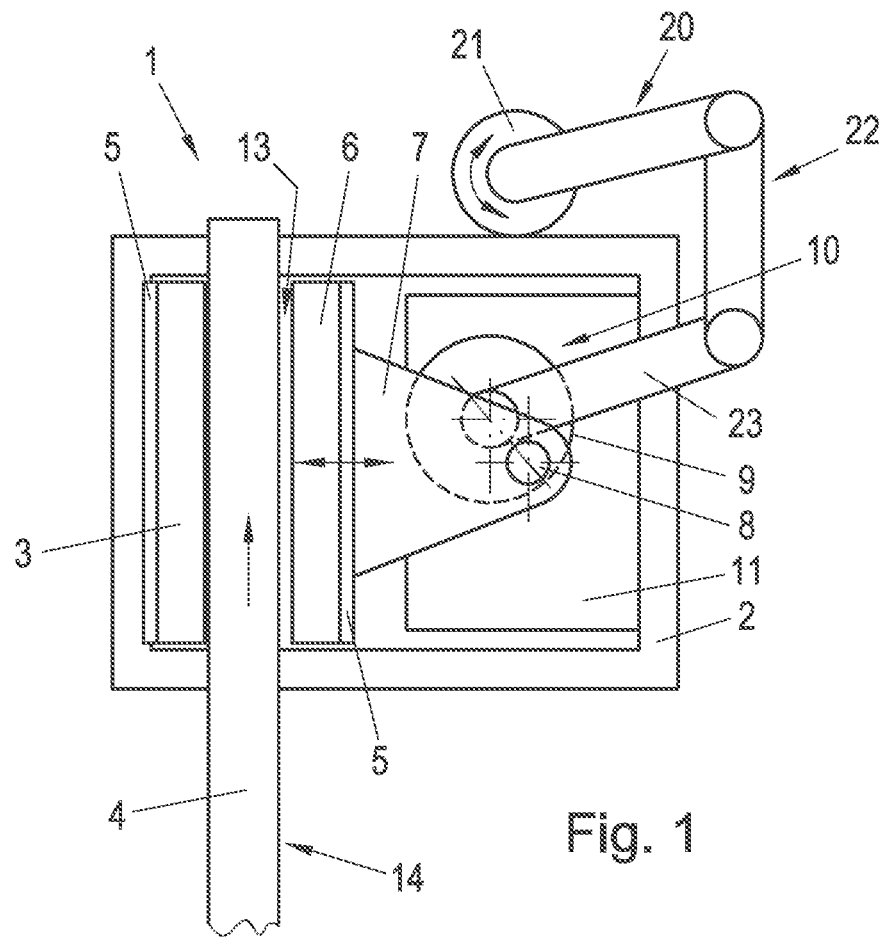
FIG. 1 shows a schematic illustration of a floating caliper disc brake with brake actuation as an example of a friction brake.

FIG. 1 shows a friction brake 1 having a floating caliper 2 as a brake caliper, which surrounds a friction surface 14, here in the form of a brake disc 4. On the floating caliper 2 there is a fixed brake pad 3 (related to the floating caliper 2) and a movable brake pad 6 (also related to the floating caliper 2). The movable brake pad 6 is pressed against the brake disc 4 by a pressing device 10, or pressor, with an actuating part, or actuator, after overcoming an air gap 13 that is usually present, as indicated by the double arrow in FIG. 1. The pressing device 10 or the actuating part is driven by an actuating device 20, for example an electric motor 21. In the non-actuated state of the friction brake 1, the movable brake pad 6 is usually and preferably retracted until it lifts off the brake disc 4 in order to prevent any undesirable losses due to a remaining residual braking torque. Of course, the fixed brake pad 3 should also be lifted off the friction surface 14. By actuating the friction brake 1, the floating caliper 2 automatically centers itself in a known manner, so that both brake pads 3, 6 abut on the brake disc 4 and are pressed against it. This creates the brake force that produces a certain braking torque. The brake pad 3, 6 can also be arranged on a pad carrier 5.

The pressing device 10 is arranged on a brake part. The brake part can be the floating caliper 2, but can also, as herein, be a well-known wear adjuster 11. The wear adjuster 11 in the illustrated embodiment of the friction brake 1 is arranged on the floating caliper 2 and the pressing device 10 is in turn arranged on the wear adjuster 11. The entire pressing device 10 is moved by the wear adjuster 11 to compensate for any wear on the brake pads 3, 6. The pressing device 10 or the movable brake pad 6 can preferably be guided in the friction brake 1, for example as here in the floating caliper 2. Since the wear adjuster 11 only has to move very short distances and only needs to adjust them from time to time, the pressing device 10 is arranged in a quasi-stationary manner in the friction brake 1. Such a wear adjuster 11 is known per se in a wide variety of designs, which is why it is not discussed in more detail here. The wear adjuster 11 is usually adjusted only in the event of an excessive air gap 13 between the brake pad 3, 6 and the friction surface 14 (similar to drum brakes) in order to reduce the air gap 13. In normal operation of the friction brake 1, the air gap 13 increases continuously due to wear, which can be compensated for by the wear adjuster 11.

The pressing device 10 comprises in the embodiment shown a holding part 7, on which the brake pad 6 or the pad carrier 5 abuts. A pressing shaft 8 is supported on both sides in the holding part 7. The pressing shaft 8 is designed as a shaft journal of an actuation shaft 9, or is mounted in an actuation shaft 9 designed as a hollow shaft, whereas the shaft journals or the axial bore of the actuation shaft 9 being designed eccentrically to the axis of rotation of the actuation shaft 9. The actuating shaft 9, which is mounted on a stationary or quasi-stationary brake part, here for example the wear adjuster 11, is rotated by the actuating device 20, so that the pressing shaft 8, and thus also the brake pad 6, is moved due to the eccentricity, depending on the direction of rotation, towards or away from the brake disc 4 (indicated by the double arrow). Hence, the brake forces are generated here via an eccentric. Likewise, the pressing device 10 could be designed in the form of a cam which engages on the pad carrier 5 or on a holding part 7, or in the form of a toggle lever. Multi-stage gears or ball spindles are also suitable as the pressing device 10. Common to all embodiments is the actuating device 20, which moves an actuating part of the pressing device 10, for example an actuating shaft 9 having an eccentrically mounted pressure shaft 8, a cam, a ball screw, a lever, etc., by an actuating travel, for example rotates by an angle or shifts by a distance, for actuating the friction brake 1. The actuation travel then effects the movement of the brake pad 6 in the direction of the friction surface 14 or away from it. Possible designs of the pressing device 10 can be found, for example, in WO 2010/133463 A1 or AT 513 989 A1, although the invention is course not limited to these designs.

In FIG. 1, an electric motor 21 is provided as the actuating device 20, which in the embodiment shown rotates an actuating lever 23 arranged on the actuating shaft 9, and thus the actuating shaft 9, via a linkage 22. Of course, any other suitable drive could also be considered as the actuating device 20, for example an electric motor that drives the actuating shaft 9 directly or via a gear. The actuating device 20 could, however, also comprise a spring which, at least in part, acts in addition to the electric motor 21. The spring could also be used to actuate the brake and the electric motor 21 to release and hold the brake released. This version is used in particular when the friction brake 1 has to be securely actuated in the deenergized state, such as in the case of railroad brakes, a service brake of a machine or an elevator. In this case, the spring actuates the friction brake 1 when the electric motor 21 can no longer keep the brake released due to a failure of the supply energy.

The pressing device 10 has a certain fixed working range, in the form of an actuating travel range of the actuating part, for example the rotation travel of the actuating shaft 9 or the displacement travel of a ball screw. The working range is advantageously chosen so that there are favorable transmission ratios for generating the brake forces, that is to say, for example, high forces at short travel distances.

Figure 3:
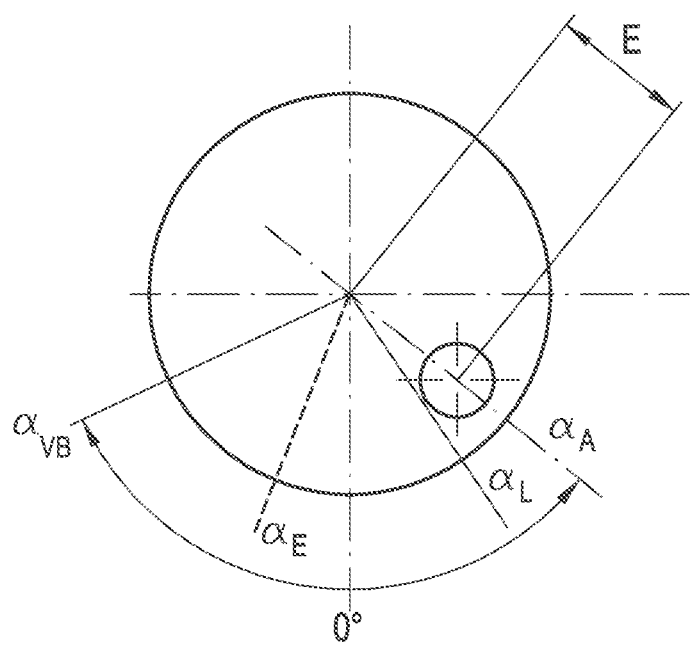
FIG. 3 shows the actuation angle range using the example of an eccentrically operated friction brake.
Figure 2:
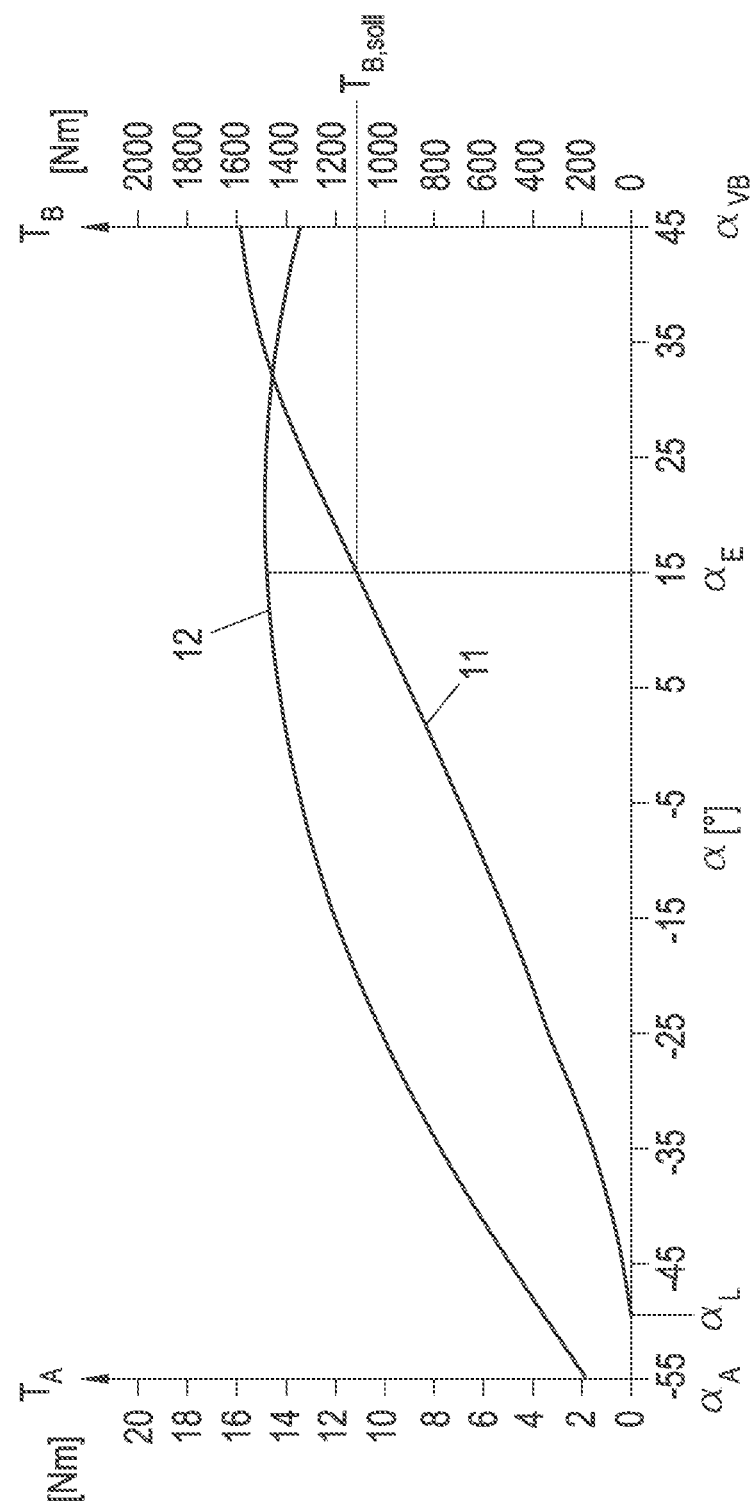
FIG. 2 shows the course of the actuating torque $T_A$ and the braking torque $T_B$ as a function of the actuation angle $\alpha$.

Such a friction brake 1 usually has a travel-braking action curve, which can also be non-linear, as will be explained in more detail with reference to FIGS. 2 and 3. For a friction brake 1, as shown in FIG. 1, FIG. 2 shows the exemplary course of the actuation torque $T_A$ (curve 12) and the resulting braking torque $T_B$ (curve 11) over the actuation travel α, which is an angle in the embodiment shown. The actuating torque $T_A$ must be applied by the actuating device 20, here the electric motor 21. The actuation travel for braking extends from a starting position $α_A$ to a position $α_{VB}$ when the brakes are fully applied, with the possible working range extending in between. The angular positions are given here in relation to a zero position, which corresponds to the bottom dead center of the eccentric (FIG. 3). The eccentricity E (greatly exaggerated in FIG. 3) is, for example, 0.5 mm, so that a theoretically maximum stroke of the brake pad 6 of 1 mm arises for the theoretically maximum rotation angle from −90° (maximum distance from the disc) to +90° (maximum near the disc). Of this, a little less is used in practice, for example from −60° in the starting position $α_A$ to full braking $α_{VB}$ at e.g. +60°, which would result in an actuation travel for full braking of 120°. Normal braking will usually have a shorter actuation travel between a starting position $α_A$ and an end position $α_E$, for example 15°, at which the braking torque $T_{B,soll}$ required in each case is achieved.

At the beginning of the operation, the air gap 13 must be overcome. This means that, starting from the starting position $α_A$, a certain actuation travel must be covered until the air gap 13 is overcome at a contact point $α_L$ and the brake pad 6 abuts on the friction surface 14. From this contact point $α_L$, a braking effect is generated, for example a braking torque $T_B$.

Due to the non-linear actuation mechanism of the friction brake 1 according to FIG. 1, the low-force actuation travel is quickly covered at the beginning and, with increasing brake force, the mechanical transmission ratio is changed in favor of a smaller actuation travel increase (and input force increase). If the eccentric is rotated further to the friction surface 14, the increase in actuation travel decreases and the pad pressing force increases with the same input force (or input torque). It can be seen in FIG. 2 that, without further increase in the actuating torque $T_A$, the braking torque $T_B$ is further increased by the eccentric due to the non-linearity. In addition to the non-linearity in the forward direction of travel, known self-reinforcement can also occur in the friction brake 1, which is why the actuating torque $T_A$ even drops in the embodiment shown, for example, from approximately 20° of the actuation travel α. In the exemplary embodiment shown, self-reinforcement can begin from an actuation travel α=0°, that is to say when the eccentric exceeds the bottom dead center. Of course, the friction brake 1 could also be designed such that no self-reinforcement occurs, for example in that the brake pad 6 or the pad carrier 5 only abutting loosely on the holding part 7, as a result of which the frictional force between the brake pad and the friction surface would not be transmitted to the pressing device 10, which is a prerequisite for self-reinforcement.

The above considerations naturally apply in general to a friction brake and consequently in an analogous manner also to friction brakes of another type.

For the brake actuation, a certain braking effect is required from the friction brake 1, for example from a driver of a vehicle via the brake pedal, from a braking or stability system of a vehicle, from a brake control of a machine, etc. As already mentioned, a normal force (brake force), a friction force (as a product of normal force and coefficient of friction) or a braking torque (as a product of friction force and assumed friction radius) can be used as the braking effect. This braking effect can then be adjusted by the friction brake 1 by actuating the friction brake 1 by means of the pressing device 10 and the actuating device 20. For this, an effect measure WM is needed, which allows conclusions about a certain braking effect when actuating the friction brake 1. The effect measure WM is therefore a measure of the braking effect. A braking effect can of course be used directly as effect measure WM, for example a braking torque or a braking force. However, an effect quantity which is related to the braking effect or which is dependent or derived therefrom can also be used as the effect measure. For example, an actuation energy (as the sum or integral of force*displacement or torque*angle) can be used as effect measure, as described in WO 2014/170259 A2, which is required to generate the braking effect. The motor current or the motor torque of the electric motor 21 could also be used as effect measure. Of course, instantaneous values, for example an energy or an electric current of the electric motor 21, could also be determined during brake actuation, and the current effect measure WM could be calculated by summing the instantaneous values. Of course, there are a number of other options for the effect measure WM, which does not even have to be a physical quantity. The only thing that is decisive is that a braking effect acting during actuation of the brake can be derived or converted from the effect measure WM.

In the same way, a general actuation measure BM can be used instead of the actuation travel. The actuation measure BM can either be directly the actuation travel $\alpha$, or an actuation quantity derived or related to it. The elastic deformation of the friction brake 1 when actuated, which is of course directly dependent on the actuation travel and on the known elastic behavior of the friction brake 1, can also be used as the actuation measure BM. The speed or angle of rotation of the electric motor 21 could also be used as the actuation measure BM. The actuation measure BM is therefore a measure for the actuation of the friction brake 1, or in other words a measure of how much actuation travel has been covered for the actuation.

In general terms, the actuation behavior of the friction brake 1 can therefore be represented in the form of a effect measure/actuation measure characteristic curve 30, for example in the form of the braking-torque/actuation-travel characteristic curve 11, as in FIG. 2. For a friction brake 1, this effect measure/actuation measure characteristic curve can for example be measured, calculated or simulated from a strength calculation (for example by finite element simulation), calculated from mathematical models of the friction brake 1, etc., and can in principle be assumed to be known. This effect measure/actuation measure characteristic curve 30 can also depend on other influencing variables, such as, for example, the temperature of the friction brake 1 or parts thereof, the state of wear of the brake pad and/or the friction surface 14, etc. This can also lead to a plurality of characteristic curves (for example also in the form of characteristic diagrams) for different influencing variables, for example to a characteristic curve field having characteristic curves for different temperatures (or stiffnesses of the friction brake 1) or for different wear states of the brake pad 3, 6. It does not matter how these known characteristic curves are stored for a control unit of the friction brake 1, for example in tabular form, in the form of a functional relationship, etc.

Since the effect measure/actuation measure characteristic curve 30 represents a braking effect of the friction brake 1, the effect measure/actuation measure characteristic curve 30 relates naturally to an abutting brake pad 6 starting from the contact point $\alpha_L$, since otherwise there can be no braking effect or deformation. Of course, the air gap 13 must be overcome before the contact point $\alpha_L$, as was explained with reference to FIG. 2.

The contact of the brake pad 6 with the friction surface 14 could be measured, for example by means of force sensors. However, this is disadvantageous per se in a friction brake 1 because a friction brake 1 is a safety-relevant device, which also places high demands on the functional safety of any sensor system in connection with a friction brake 1. Such a sensor system would therefore also have to be functionally safe, which generally requires a redundant version of the sensor system. However, since a friction brake 1 is also a mass product, it is also subject to high cost pressure, which is why a redundant design of any part of the friction brake 1 would be disadvantageous for reasons of cost. It is therefore assumed in the sense of the invention that the air gap 13 is known in a certain state of the friction brake 1 because the air gap is adjusted in a controlled manner after braking, as will be described in detail below. It is thus also known how much actuation (for example actuation travel) is necessary in order to overcome the air gap 13 and the air gap 13 does not have to be measured.

Figure 4:
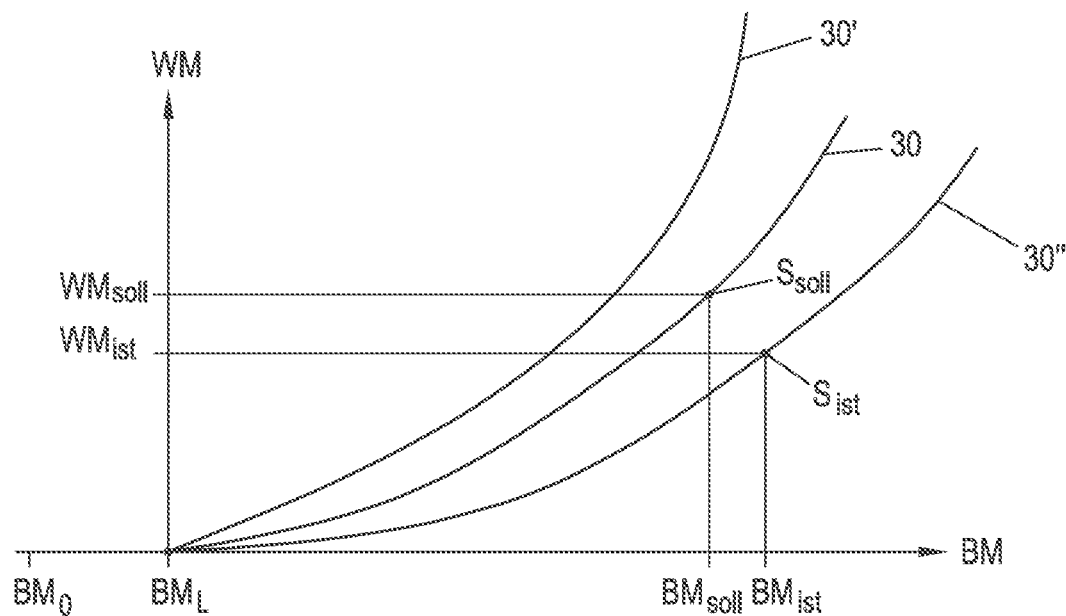
FIG. 4 shows a effect measure/actuation measure characteristic curve with a braking operation.

To carry out braking with the friction brake 1, the procedure is therefore as follows, for example, with reference to FIG. 4. FIG. 4 shows, for example, a effect measure/actuation measure characteristic curve 30 of a friction brake 1. A braking effect is requested for braking, e.g. a certain braking torque. This braking effect can be directly translated to an effect measure $WM_{soll}$ as a measure for the desired braking effect on the basis of the predetermined or known relationship with the effect measure WM. Of course, a required effect measure $WM_{soll}$ could also be set directly. From the given effect measure/actuation measure characteristic curve 30, the actuation measure $BM_{soll}$, as a measure of the actuation travel to be adjusted by the friction brake 1, can be obtained, which is to be adjusted in order to achieve the effect measure $WM_{soll}$. However, this actuation measure $BM_{soll}$ is of course only the actuation measure starting from the contact point $\alpha_L$, that is to say from the point in time at which the brake pad 6 is in contact with the friction surface 14. The friction brake 1 is then actuated until the actuation measure $BM_{soll}$ is reached. Hence, for braking, a certain point $S_{soll}$ on the effect measure/actuation measure characteristic curve 30 is to be reached.

Before a braking effect can occur, the air gap 13 must of course be overcome. This means that the actuation of the friction brake 1 begins at an actuation measure $BM_0$ before the contact point at the actuation measure $BM_L$, at which the brake pad 6 begins to abut on the friction surface 14. The entire actuation of the friction brake 1 is thus composed of overcoming the known air gap 13 ($BM_L$-$BM_0$) and the actuation required for setting the desired braking effect ($BM_{soll}$-$BM_L$). After braking, it is reset to the beginning at $BM_0$.

FIG. 4 also indicates that there may be different effect measure/actuation measure characteristic curves 30, 30', 30" for different influencing variables, such as for different temperatures or wear states of the friction brake 1. Of course, the effect measure/actuation measure characteristic curve 30, 30', 30" that comes closest to the current value of the influencing variable is then used for brake actuation. If necessary, it is of course also possible to interpolate between existing characteristic curves.

In WO 2014/170259 A2, this basic procedure is described using an actuation energy as the effect measure WM and the angle of rotation as the actuation measure BM. Due to various factors, it may be the case that the effect measure $WM_{ist}$ which is actually achieved and which can be measured or estimated, deviates from the expected effect measure $WM_{soll}$ at the adjusted actuation measure $BM_{soll}$, as shown in FIG. 4. It is also conceivable, that not the intended actuation measure $BM_{soll}$ is achieved, but rather an actuation measure $BM_{ist}$ deviating therefrom which can be measured or estimated. In an actual braking it may therefore happen that not the desired point $S_{soll}$ on the effect measure/actuation measure characteristic curve 30 is reached, but rather a point $S_{ist}$ deviating therefrom. This deviation can now be compensated by increasing or decreasing the actuation measure BM accordingly, that is to say the brake pad 6 is pressed further or is lifted somewhat in order to adjust the desired braking effect. This method works very well, but is to be improved according to the invention with regard to the accuracy and speed of braking.

For this purpose, a thermal model of the friction brake 1 is used, with which the thermal expansion of the friction brake 1 can be determined as a function of a current temperature of the friction brake 1. Also a model of one or more parts of the friction brake 1 is understood to be a thermal model of the friction brake 1. It is therefore not necessary for the thermal model to model the thermal behavior of the entire friction brake 1. Different components of the friction brake 1 can also be modeled by different, linked thermal sub-models. The sum of the thermal sub-models then results in the thermal model of the friction brake 1. Such a thermal model can be created in advance on the basis of the known construction of the friction brake 1, for example empirically, mathematically on the basis of simulations or also on the basis of physical considerations, and is assumed to be given. For the invention, however, it does not really matter how the thermal model is constructed.

For the thermal model of the friction brake 1, a temperature of the friction brake 1 and/or temperatures of certain components of the friction brake 1 and/or an ambient temperature of the friction brake 1 must either be measured as input variables of the model, for example a housing temperature of the friction brake 1 or a temperature of the electric motor 21, or can be obtained from a temperature model. A combination of these is also conceivable. Certain temperatures will be easy to measure, such as a housing temperature or an engine temperature, and are therefore preferably measured. On the other hand, other temperatures are very complex to measure or are susceptible to interference, such as the temperature of the brake pad 6 or the friction surface 14, and are therefore preferably determined from suitable temperature models. A plurality of temperature part models can also be used, such as for the disc temperature, the pad temperature or the temperature of certain heat-expanding parts. A temperature model sensibly consists of a heat supply, e.g. from the braking power (e.g. braking torque*angular velocity of the friction surface) or a part thereof, a thermal resistance via which heat is supplied, and a heat dissipation, which physically consists of blackbody radiation and dissipation through air. For the dissipation through air, a static part (e.g. with a stationary vehicle) and a speed-dependent part can also be taken into account. In addition, thermal inertia can also be taken into account in order to model the time behavior. The temperature model can also be coupled to measurable temperatures, for example to take the ambient temperature into account or to compare the calculated values with measurable ones and, for example, to make corrections. Linear or non-linear behavior with temperature can be assumed for thermal expansion. It makes sense to take into account the time delays in the occurrence of thermal expansion, for example because the brake caliper heats up more slowly than the brake disc. Such time delays can be easily represented in the model, for example, with single and multi-stage low-pass filters. The thermal resistances can be constant, or also speed-dependent (air cooling effect). There may be heat-dissipating resistors (cooling) and heat-supplying resistors (such as the heat that can be supplied to the brake caliper via the brake pads). These thermal resistances and other model components in the model can be assigned to real components (such as a brake disc), but they can also be mere model parameters that show an effect (e.g. expansion) over temperature and time, for example, but are not exactly assigned to a component of the friction brake 1. For the invention, however, it does not matter how the thermal model is constructed.

The thermal model of the friction brake 1, or a partial model of the thermal model, can also be used to determine the stiffness of the friction brake 1, or parts thereof, which changes due to the changed temperature conditions. For example, the correct effect measure/actuation measure characteristic curve 30, 30', 30" for braking can be selected according to the temperature or stiffness. This could also be taken into account by an appropriate stiffness correction measure SKM. If the friction brake 1 is less stiff, for example, at higher temperatures, then a lower effect measure WM is achieved with a certain actuation measure BM because the proportion of the deformation of the friction brake 1 is greater. This relationship can be determined in advance, for example empirically or by simulations or calculations, and can be stored in the form of a stiffness correction measure SKM, with which the effect measure WM can be corrected.

Figure 5:
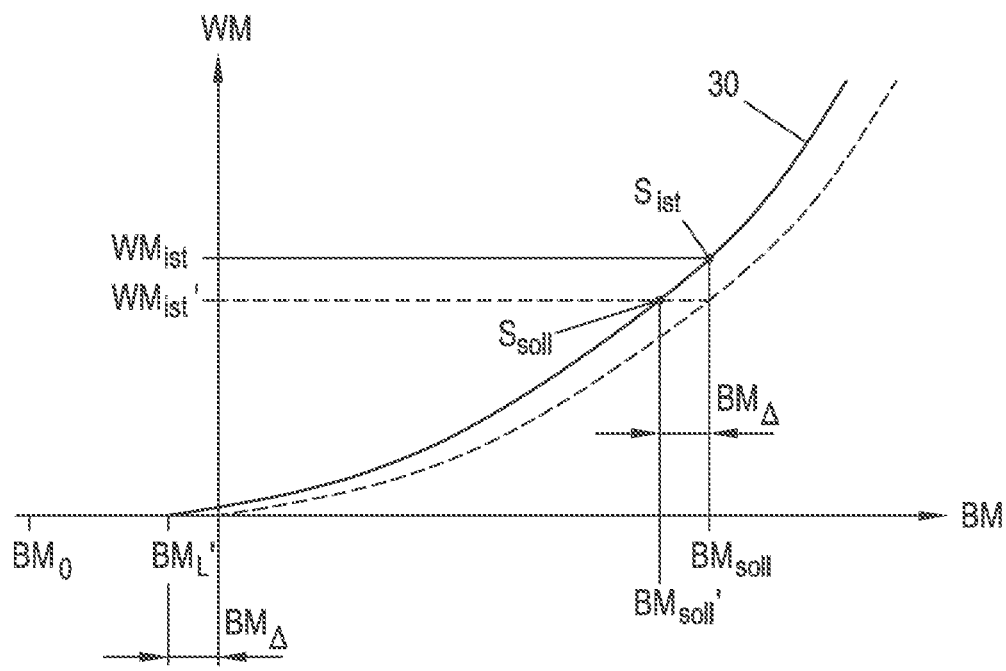
FIG. 5 shows the deviation in the effect measure/actuation measure characteristic curve due to the thermal state of the friction brake.

Due to the temperature-dependent thermal expansion of the friction brake 1, the air gap 13 can change. For example, a pad carrier 5 or a brake pad 3, 6 expands with increasing temperature (air gap 13 can become smaller), or a brake caliper expands with increasing temperature (air gap 13 can become larger). With falling temperatures, of course, the reverse effect occurs. This can lead, for example, to the air gap 13 becoming smaller (or larger) and the contact point $\alpha_L$ (actuation measure $BM_L$) actually being reached earlier (or later) than assumed (as indicated in FIG. 5). A braking effect is thus built up earlier and an actual effect measure $WM_{ist}$ is adjusted based on the actuation measure $BM_{soll}$ to be set, which corresponds, for example, to an excessive braking effect. The reverse can of course also occur.

This influence becomes concrete when one considers that the temperature of a friction brake 1 can increase by several hundred ° C. in a single braking operation, which can lead to significant thermal expansions. Therefore, according to the invention, the thermal expansion of the friction brake 1, or parts thereof, is determined with the thermal model of the friction brake 1 in order to determine the temperature-related shift in the contact point of the brake pad 6 and the friction surface 14. The thermal expansion is of course related to a reference temperature, to which the effect measure/actuation measure characteristic curve 30 is also related. The shift of the contact point can of course be converted into a shift of the actuation measure $BM_A$ based on the known relationship. For the actuation of the friction brake 1, the actuation measure $BM_{soll}$ to be set is then corrected (with the correct algebraic sign) for the braking by the shift of the actuation measure $BM_A$. The correction does not necessarily have to be made with the entire shift of the actuation measure $BM_A$, but can also be only a part δ thereof, that is to say $δ·BM_A$, with $δ∈]0,1]$. The such corrected actuation measure $BM_{soll}'$ is then used for braking and leads to the corrected effect measure $WM_{ist}$ (FIG. 5). Thereby, when braking, the difference between points $S_{ist}$ and $S_{soll}$ (FIG. 4) can already be reduced and ideally entirely compensated. In the ideal case, no deviation then needs to be corrected, or only a smaller deviation has to be compensated for.

The method according to the invention is based on determining the shift of the contact point on the basis of the thermal state of the friction brake 1. Other influencing variables on the accuracy of the friction brake 1 can also be temperature-dependent, for example the stiffness, which can lead to different effect measure/actuation measure characteristic curves 30, 30',30". A effect measure/actuation measure characteristic curve 30, 30',30" is, however, temperature-independent, i.e. it is not taken into account that the temperature of the friction brake 1 can change significantly during braking. Of course, this leads to a certain inaccuracy. On the other hand, there is also a certain degree of inaccuracy in determining the shift of the contact point. These inaccuracies lead to a braking effect that is too high or too low when braking. It is therefore advantageous for the method according to the invention if the inaccuracies at least partially compensate each other and do not add up. For example, the thermal model could be designed in such a way that an error in the determination of the contact point with regard to the braking effect tends to go in a different direction than an error which is brought into the braking system by the effect measure/actuation measure characteristic curve 30, 30',30' due to changing stiffness A less stiff friction brake 1 due to higher temperature leads to a lower braking effect. The error in the contact point determination could now be included in the model in such a way that braking tends to lead to a higher braking effect.

In a similar way, of course, other influences on the accuracy of braking can also be compensated for, either additionally or alternatively.

Figure 6:
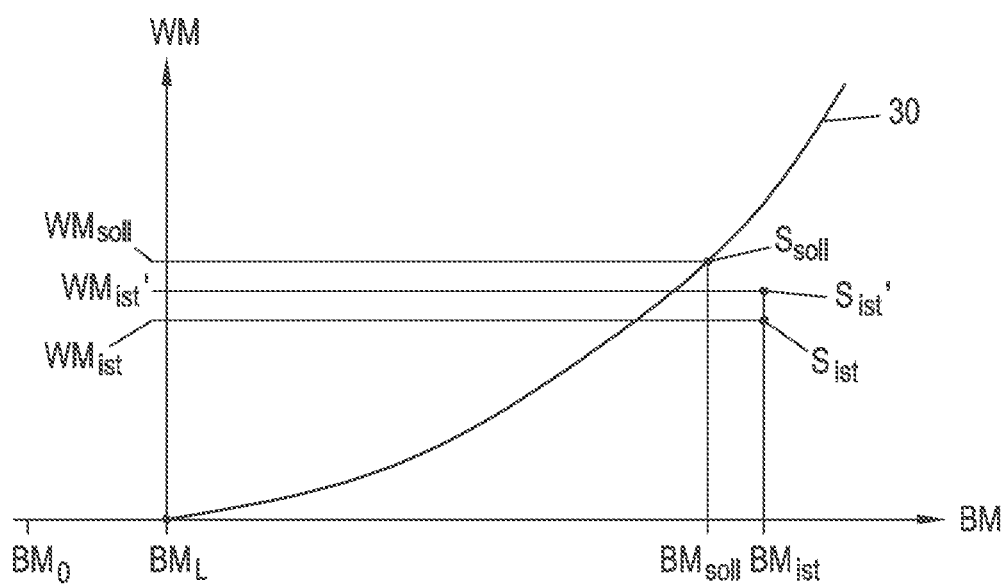
FIG. 6 shows the deviation in the effect measure/actuation measure characteristic curve due to an inaccurate determination of the effect measure and FIG. 7 shows a brake control according to the invention.

Another relevant influence on the accuracy is the inertia of the actuating device 20, for example the inertia of the electric motor 21. Part of the energy expended for actuating the friction brake 1 is thus in the kinetic energy of the moving parts and is not used for pressing the brake pad 6. The effect measure WM is determined continuously during braking, for example, measured or calculated from measured values, in order to determine the effect measure $WM_{ist}$ at the end of the braking operation. If the kinetic energy involved in the actuation is not taken into account, the actual effect measure $WM_{ist}'$ will differ from the effect measure $WM_{ist}$ determined during the actuation, as shown in FIG. 6. The actual difference between the requested effect measure $WM_{soll}$ and the determined effect measure $WM_{ist}$ is thus also corrupted. Although this difference is compensated later, a fault condition would remain, because a false effect measure $WM_{ist}$ which was determined is considered and not the actual effect measure $WM_{ist}'$.

For illustration purposes, an electric motor 21 is considered as the actuating device 20. Any moving parts between the electric motor 21 and the holding part 7 of the pressing device 10 (for example as shown in FIG. 1) are neglected for the sake of simplicity. The electric motor 21 having a known moment of inertia rotates for actuation at high speed, which results in kinetic energy, here a rotational energy. If the actuation energy is now used as the effect measure WM, as described, for example, in WO 2014/170259 A2, and is continuously determined by adding up the products of current torque*current angle of rotation, then the proportion of the kinetic energy is neglected. Part of this actuation energy is not used to generate a braking effect, but exists instead in the kinetic energy of the electric motor 21. At the end of braking, however, a lower braking effect was achieved than the determined actuation energy pretends.

Therefore, the kinetic energy of the pressing device 10 or parts thereof is taken into account when determining the effect measure $WM_{ist}$, at least during part of the braking operation, by taking out the proportion of the kinetic energy as a correction measure KM, or as part of the correction measure KM. The kinetic energy is most noticeable at high speeds of the moving parts of the pressing device 10, which is why this is at least taken into account. The inertia of the moving parts, or at least the moving parts taken into account, can be assumed to be known due to the known geometry and construction of the friction brake 1. In the case of actuation energy as an effect measure WM, this is of course very easily possible. However, due to the known geometric, kinematic and constructive relationships in the friction brake 1, the kinetic energy can also be eliminated from other effect measures WM. This means that the effect measure $WM_{ist}$ is significantly more precise at the end of braking, which also makes braking as such more precise.

In the same way, the kinetic energy required to overcome the air gap 13 may also be taken into account. If, for example, the actuation energy of the actuating means 20, for example the electric motor 21, is used as the effect measure, then actuation energy is naturally also used to overcome the air gap 13, but this does not result in braking effect. As the air gap 13 is known, this energy content can of course be subtracted at the end of the braking process as a correction measure KM, or as part of the correction measure KM, from the determined effect measure $WM_{ist}$, in order to increase the accuracy. For that purpose, the change in the air gap 13 due to the thermal expansion of the friction brake 1, or parts thereof, can of course also be taken into account.

It is not absolutely necessary to take into account all parts of the friction brake 1 that are moving during braking when determining the kinetic energy, but it is sufficient when the essential contributions are taken into account.

The consideration of the kinetic energy of moving parts of the friction brake 1 can be made in addition to the consideration of the temperature-dependent shift of the contact point. However, it is expressly noted that the consideration of the kinetic energy is possible on its own, that is also without taking into account the temperature-dependent shift of the contact point, and is also considered to be inventive.

In a basically analogous way, other influences can also be taken into account, because each influence can be seen as a falsification of the effect measure WM or the actuation measure BM.

For example, in the friction brake 1, a spring could act on the actuation mechanism according to a spring characteristic depending on the actuation travel (or generally the actuation measure BM), the spring of course not having to act over the entire actuation travel. Such a spring can thus supply energy to the actuation (when the spring is released) or dissipate energy (when the spring is tensioned). Similar to the kinetic energy, the determined effect measure $WM_{ist}$ at the end of braking will deviate from the actual effect measure $WM_{ist}'$. Since the effect of the spring on the actuation can be assumed to be known (for example via the spring characteristic and the construction of the friction brake 1), this influence can be taken into account again as a correction measure KM, or as part of the correction measure KM, when determining the effect measure $WM_{ist}$ in order to increase accuracy.

The same applies to self-reinforcement of the friction brake 1, which can be regarded as known on the basis of the known geometry of the friction brake 1 depending on the actuation travel (or generally the actuation measure BM). The self-reinforcement that occurs naturally supports braking, so that the actual effect measure $WM_{ist}'$ can differ from the determined effect measure $WM_{ist}$ at the end of braking. The effect of the self-reinforcement, which is known due to the construction of the friction brake 1, can therefore again be taken into account as a correction measure KM, or as part of the correction measure KM.

Various effects can therefore be considered with the correction measure KM in order to make the actuation of the friction brake 1 more precise, in particular by determining the effect measure $WM_{ist}$ more precisely.

All of these effects can of course also be dependent, or can be made dependent, on other influencing variables, such as temperature or wear in the friction brake 1.

The effect measure/actuation measure characteristic curve 30 (or an entire characteristic curve field) is stored in the brake control of the friction brake 1. For each friction brake 1 of the same type, the same effect measure/actuation measure characteristic curve 30 will be stored. Due to manufacturing engineering and material tolerances, it can of course happen that the real behavior of the friction brake 1 deviates somewhat from the stored effect measure/actuation measure characteristic curve 30. In order to reduce this influence, it can also be provided to carry out measurements with the friction brake 1 during the manufacture or assembly of the friction brake 1 for fine calibration, in order to measure predetermined points on the effect measure/actuation measure characteristic curve 30. Calibration factors KF, for example in the form of calibration characteristic curves over the actuation travel (or generally the actuation measure BM), which are also stored in the brake control, can then be derived from these measurements and the determined deviation from the stored effect measure/actuation measure characteristic curve 30. The brake control can then adapt the stored effect measure/actuation measure characteristic curve 30 with the calibration factors KF to the real conditions, which can also increase the accuracy.

With the corrections described (although not all of them have to be used), the detected points $S_{ist}$ will slightly differ from the theoretical points $S_{soll}$, on the effect measure/actuation measure characteristic curve 30. These remaining deviations, for example due to losses in the friction brake 1 or effects not taken into account, could also be reduced. For this purpose, a correction factor KOF can be stored or defined for the friction brake 1, with which the controlled actuation measure $BM_{ist}$ and/or determined effect measure $WM_{ist}$ is corrected. A correction factor KOF for the actuation measure BM and the effect measure WM does not have to be the same of course. Such a correction factor can be determined empirically and stored, for example, as a characteristic curve or neural network or fuzzy logic, but can also be defined as a functional (linear or non-linear) relationship.

If the brake control of the friction brake 1 often determines a different behavior of the friction brake 1 than would be expected on the basis of the stored effect measure/actuation measure characteristic curve 30, the stored effect measure/actuation measure characteristic curve 30 could also be adapted. Such a deviation can be attributed, for example, to the fact that brake pads 3, 6 having a different stiffness than expected were installed in the friction brake 1. The brake control system can continuously monitor the deviations at the end of braking and, in the event of frequent deviations beyond a certain tolerance, can correct the effect measure/actuation measure characteristic curve 30. For this purpose, correction factors (for example as described above) can be defined or the effect measure/actuation measure characteristic curve 30 could be shifted in the direction of higher or lower braking action. However, also a warning or an error could simply be issued or written to a memory, or it could be reacted to in another way.

As already mentioned above, it is assumed that the air gap 13 is known during a braking operation. It is therefore advantageous if a desired air gap 13 is readjusted after the braking event. In this way it can be ensured that the air gap 13 is also known for the next braking event. After the braking event, the air gap 13 can be adjusted to a desired value using the wear adjuster 11 or the pressing device 10, or both.

In order not to have to continually adjust the air gap 13, which would strain the wear adjuster 11, it may be provided to readjust the air gap 13 only when a deviation after braking with the friction brake 1 between the desired effect measure $WM_{soll}$ and the actually determined effect measure $WM_{ist}$ exceeds a predefined threshold value $WM_s$, i.e. if $|WM_{soll}-WM_{ist}|>WM_s$. An adjustment measure NM can then be derived from the size of the deviation, preferably an adjustment travel of the wear adjuster 11, which is adjusted after braking. The deviation can be converted, for example, from the known effect measure/actuation measure characteristic curve 30 into an actuation measure BM, which can then be used as the adjustment measure NM. However, it could also be provided that the deviation between the desired effect measure $WM_{soll}$ and the actually determined effect measure $WM_{ist}$ be converted into a deviation of the actuation measure BM by means of the stored effect measure/actuation measure characteristic curve 30 in order to derive an adjustment measure NM which is more independent of the strength of the braking. Due to the wear adjustment, the point $BM_0$ is readjusted with the adjustment measure NM, since the air gap 13 or $(BM_L-BM_0)$ has changed (usually enlarged).

Figure 7:
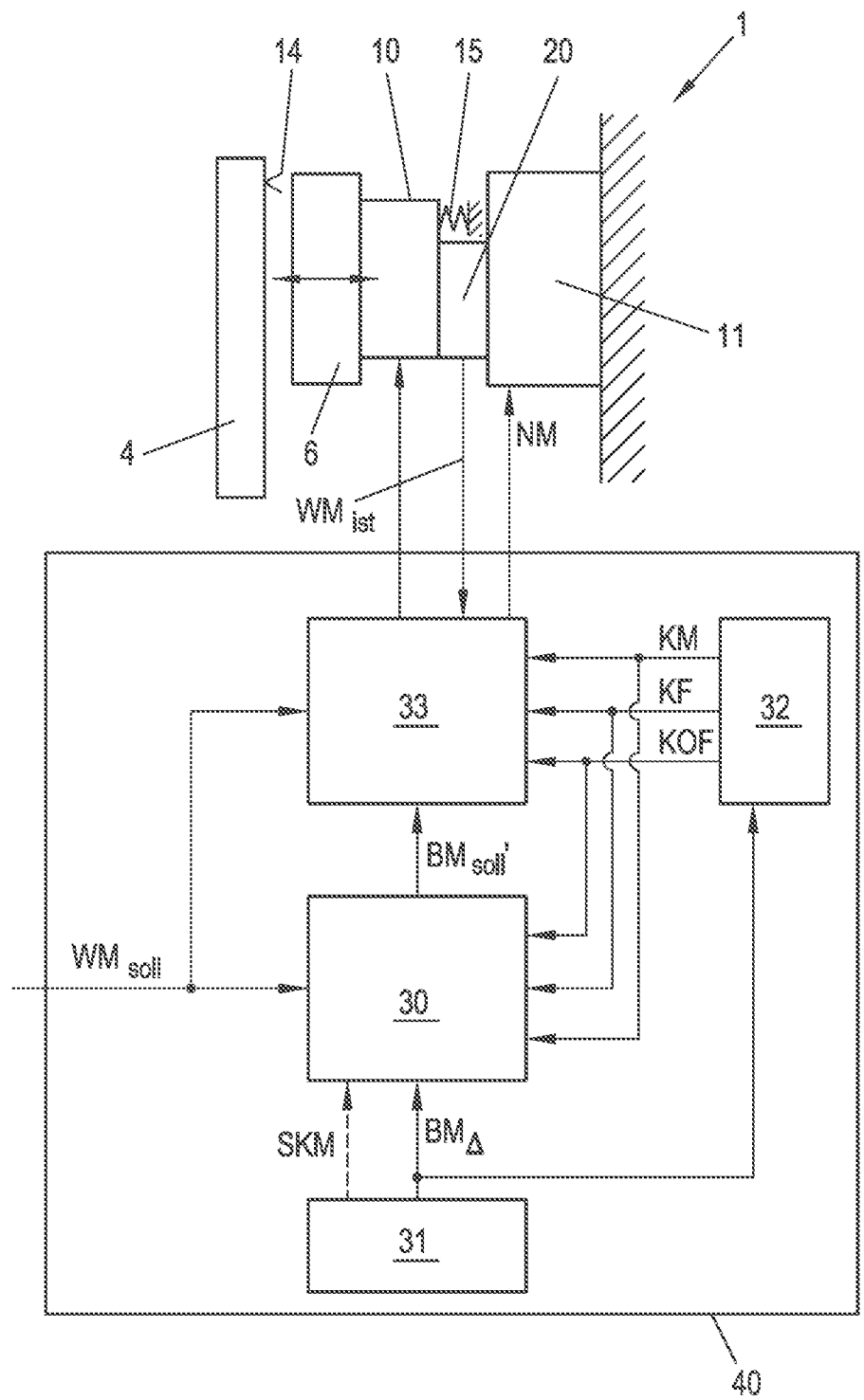

An exemplary brake control 40 of a friction brake 1 is shown in FIG. 7. The brake control 40 is implemented in suitable hardware and using the required software. From an external input, for example, a effect measure $WM_{soll}$ to be adjusted, or equivalently a desired braking effect, is set for the brake control 40. An actuation measure $BM_{soll}$ is determined from the effect measure/actuation measure characteristic curve 30 of the friction brake 1 stored in the brake control 40. The effect measure $WM_{ist}$ is determined during the braking operation, for example the actuation energy of an electric motor 21 as actuating device 20. The actual effect measure $WM_{ist}$ can of course also be determined in the control unit 33 from measured variables of the friction brake 1, for example from actual values of motor current or torque and angle of rotation of the electric motor 21. A thermal model 31 of the friction brake 1 is also stored in the brake control 40, with which the shift of the contact point by thermal expansion of the friction brake 1, or parts thereof, is determined. The measurement parameters required for this (which also depend on the specific implementation of the model), such as certain temperatures or performance characteristics of the friction brake 1, are not shown in FIG. 7 for reasons of clarity. With the thermal shift of the contact point, the effect measure/actuation measure characteristic curve 30 can be corrected with the shift of the actuation measure $BM_A$ in order to determine the corrected actuation measure BMsoii % which is required by a control unit 33 for actuating the friction brake 1. With this corrected actuation measure $BM_{soll}$', the actuating device 20 of the pressing device 10 is actuated in order to press the brake pad 6 against the friction surface 14 in order to produce the desired braking effect. The thermal model 31 could also determine a stiffness correction measure SKM with which the effect measure/actuation measure characteristic curve 30 can be corrected as described above.

A correction unit 32 can also be implemented in the brake control 40, in which further influences on the brake actuation can be taken into account, for example the effect of a spring 15, the effect of self-reinforcement, the influence of the kinetic energy of the pressing device 10 and/or of the actuating device 20, the kinetic energy to overcome the air gap 13 (possibly taking into account the current thermal expansion of the friction brake 1), a frequent deviation from the stored effect measure/actuation measure characteristic curve 30. For this purpose, the correction unit 32 can determine a correction measure KM with which the effect measure/actuation measure characteristic curve 30 and/or the determination of the actual effect measure $WM_{ist}$ can be influenced at the end of the braking process, as explained in detail above. Likewise, the correction unit 32 can determine calibration factors KF or correction factors KOF as described.

The control unit 33 of the brake control 40, or also a separate unit in the brake control 40, can also ensure after the braking event that the air gap 13 is reset to a desired value. For this purpose, the control unit 33 controls the actuating device 20 of the pressing device 10 and/or a wear adjuster 11, for example in order to reset to the actuation measure $BM_0$. In the case of a too large deviation between the desired effect measure $WM_{soll}$ and the actual effect measure $WM_{ist}$ determined at the end of braking, an adjustment measure NM can be determined in order to actuate the wear adjuster 11 and/or the actuating device 20 of the pressing device 10.

The invention claimed is:

1. A method for actuating a friction brake that includes a brake pad arranged on a pressor to be pressed against a friction surface that is driven by an actuator of the friction brake, said method comprising:
for a braking operation to achieve a predetermined effect measure of the friction brake, the effect measure being a measure of a braking effect, the method comprises moving the brake pad of the friction brake from an initial position, while overcoming an air gap, to the friction surface of the friction brake, and the brake pad is pressed against the friction surface starting from a contact point between the brake pad and the friction surface;
determining and adjusting an actuation measure of the friction brake corresponding to the predetermined effect measure by means of the pressor and the actuator;
determining a thermal expansion of the friction brake using a thermal model of the friction brake and, therefrom, determining for the braking operation a temperature-dependent shift in the contact point that causes a change in the air gap between the initial position and the contact point, and the temperature-dependent shift in the contact point and changed air gap being taken into account when determining the actuation measure of the friction brake to be adjusted.

2. The method according to claim 1, wherein:
the actuation measure to be adjusted is increased or decreased depending on the shift of the contact point.

3. The method according to claim 1, wherein:
the effect measure is determined at the end of the braking operation and, for the determination of the effect measure, the kinetic energy of the pressor and/or the actuator, or parts thereof, is at least partially taken into account for the braking operation.

4. The method according to claim 3, wherein:
the kinetic energy of the pressor and/or of the actuator, or parts thereof, required to overcome the air gap is taken into account when determining the effect measure.

5. The method according to claim 4, wherein:
the temperature-dependent shift of the contact point is taken into account when determining the kinetic energy required to overcome the air gap.

6. The method according to claim 1, wherein:
during the braking operation, a spring acts at least temporarily on the pressor and/or the actuator and the effect of the spring is taken into account when determining the effect measure.

7. The method according to claim 1, wherein:
self-reinforcement of the friction brake acts at least temporarily during the braking operation and the effect of the self-reinforcement is taken into account when determining the effect measure.

8. The method according to claim 1, wherein:
a determined effect measure and/or an adjusted actuation measure is corrected with a predetermined correction factor.

9. The method according to claim 1, wherein:
at the end of the braking operation a remaining deviation between the predetermined effect measure and the effect measure determined at the end of the braking operation is compensated for.

10. The method according to claim 9, wherein:
the deviation is compensated for by actuating the pressor and/or the actuator.

11. The method according to claim 9, wherein:
the deviation is compensated for by actuating a wear adjuster on which the pressor is arranged.

12. The method according to claim 1, wherein:
using the thermal model, the stiffness of the friction brake, or parts thereof, which changes due to changed temperatures, is determined and the changing stiffness is taken into account when actuating the friction brake.

13. The method according to claim 1, wherein after braking, the air gap is adjusted if a deviation between the predetermined effect measure and an actually determined effect measure exceeds a predetermined threshold value.

14. The method according to claim 13, wherein:
an adjustment measure is derived from the deviation, with which the air gap is adjusted using a wear adjuster and/or the pressor.

15. A brake control for actuating a friction brake, comprising:
a pressor of the friction brake configured to press a brake pad against a friction surface of the friction brake for a braking operation, and an actuator configured to drive the pressor, the pressor being configured to move the brake pad for the braking operation in order to achieve a predetermined effect measure of the friction brake, the effect measure being a measure of a braking effect, from an initial position while overcoming an air gap to the friction surface of the friction brake and presses the brake pad starting from a contact point between the brake pad and the friction surface against the friction surface;

the brake control being configured to determine an actuation measure of the friction brake which is associated with the predetermined effect measure and controls the actuator to adjust the actuation measure;

a thermal model of the friction brake being stored in the brake control in order to determine a thermal expansion of the friction brake and, therefrom, to determine for the braking operation a temperature-dependent shift of the contact point that causes a change in the air gap between the initial position and the contact point;

the brake control takes into account the temperature-dependent shift of the contact point and changed air gap when determining the actuation measure of the friction brake to be adjusted.

16. The brake control according to claim 15, wherein:

the brake control is configured to determine the effect measure at the end of the braking operation and compensates for a remaining deviation between the predetermined effect measure and a determined effect measure at the end of the braking operation by actuating the pressor and/or the actuator.

17. The brake control according to claim 16, wherein:

the brake control at least partially takes into consideration the kinetic energy of the pressor and/or the actuator, or parts thereof, used for the braking operation, for determining the effect measure.

18. The brake control according to claim 16, wherein:

the brake control at least partially takes into account the kinetic energy of the pressor and/or of the actuator, or parts thereof, used to overcome the air gap for determining the effect measure.

\* \* \* \* \*